United States Patent [19]

Ruetman

[11] 3,819,558

[45] June 25, 1974

[54] PROCESS FOR PRODUCING CHLORINATED 2,2'- OR 4,4'-BIPYRIDINES

[75] Inventor: Sven H. Ruetman, Walnut Creek, Calif.

[73] Assignee: The Dow Chemical Company, Midland, Mich.

[22] Filed: Apr. 26, 1973

[21] Appl. No.: 354,720

Related U.S. Application Data

[63] Continuation-in-part of Ser. No. 187,533, Oct. 7, 1971, abandoned.

[52] U.S. Cl............ 260/296 D, 260/294.9, 424/263, 71/94
[51] Int. Cl............................................ C07d 31/42
[58] Field of Search...... 260/294.9, 296 D, 290 HL, 260/290 P

[56] References Cited

UNITED STATES PATENTS

| | | | |
|---|---|---|---|
| 3,251,848 | 5/1966 | Taplin | 260/290 HL |
| 3,420,833 | 1/1969 | Taplin | 260/294.9 X |
| 3,575,992 | 4/1971 | Taplin | 260/294.9 |

*Primary Examiner*—Alan L. Rotman
*Attorney, Agent, or Firm*—J. Roger Lochhead

[57] ABSTRACT

Substituted or unsubstituted 2,2'- or 4,4' bipyridines are ring chlorinated with up to a total of four chlorine atoms by a process wherein a prevaporized mixture of a bipyridine and a reaction medium are contacted with excess chlorine at a temperature of from about 200° to 400°C.

4 Claims, No Drawings

PROCESS FOR PRODUCING CHLORINATED 2,2'- OR 4,4'-BIPYRIDINES

The instant Application is a continuation-in-part of my co-pending application Ser. No. 187,533, filed Oct. 7, 1971, now abandoned, entitled "A PROCESS FOR PRODUCING CHLORINATED BIPYRIDINES."

BACKGROUND OF THE INVENTION

Highly chlorinated bipyridine compounds, which have been reported useful as intermediates in the production of dyestuffs and pharmaceutically-active materials, especially those of the sulphonamide type, as well as having biological activity themselves, have been produced according to British Patent No. 1,163,472, by the reaction of a bipyridine with phosphorous pentachloride at a temperature between 200° and 600°C.

Perchlorinated bipyridines, on the other hand, have been produced according to U.S. Pat. No. 3,420,833 wherein vapors of a bipyridine and chlorine are reacted in the presence of an inert diluent at a temperature of 400° to about 700°C. Other processes are taught in U.S. Pat. No. 3,575,992 and British Patent No. 1,276,253.

SUMMARY OF THE INVENTION

It has now been found that, under carefully controlled conditions of temperature, partially chlorinated derivatives of substituted or unsubstituted 2,2'- or 4,4'-bipyridines can be produced in good yields.

In accordance with the present invention, compounds of the formulas

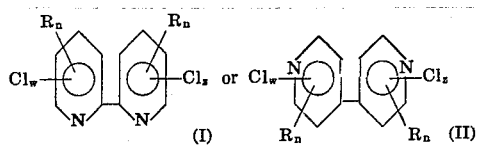

wherein, in said formulas, each R, is, independently Cl, Br, F, CN, $NO_2$, $CH_3$, $CCl_3$ or $CF_3$; each $n$ is, independently, 0 to 1; $w$ is 0 to 2; and $z$ is 1 to 2, are produced by rapidly and turbulently contacting a prevaporized mixture of a diluent, i.e., reaction medium, and a bipyridine compound with a stoichiometric excess of gaseous chlorine during a brief contact time, usually no more than about 100 seconds, at a temperature of from about 200° to 400°C.

The partially chlorinated bipyridine compounds produced by the process of the present invention have been reported useful as intermediates in the production of dyestuffs and pharmaceutically-active materials, especially those of the sulphonamide type, as well as the compounds themselves being useful as fungicides, herbicides, insecticides, bactericides, and plastic stabilizers.

DETAILED DESCRIPTION OF THE INVENTION

Bipyridines of the generic formula

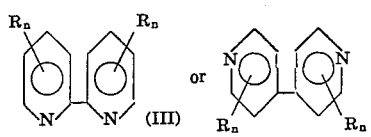

wherein, in said formula, R and n are as above defined, are generally suitable as starting materials. Many substituted 2,2'- and 4,4'-bipyridines have been reported in the literature. Following is a list, for purposes of illustration only, demonstrating some of the reported substituents and their ring positions on said 2,2'- and 4,4'-bipyridines:

| | |
|---|---|
| Cl | 4; 6; 4,4' and 5,5'. |
| Br | 4; 6; 4,4'; 5,5' and 6,6'. |
| F | 3 and 3,3'. |
| CN | 6 and 6,6'. |
| $NO_2$ | 4,4'. |
| $CH_3$ | 2; 3; 4; 2,6; 2,2'; 3,3'; 3,5'; 4,4'; 5,5' and 6,6'. |

A number of other bipyridines can be prepared by those skilled in the art. For instance, symetrically substituted bipyridines may generally be prepared by the Ullmann reaction, brominated bipyridines can be converted to the nitrile analog, $CH_3$ substituents may be converted to $CCl_3$ by chlorination and $CCl_3$ may be converted to $CF_3$. Other variations will be obvious to those skilled in the art. It is to be understood that the positions and identity of said substituents on the starting bipyridine, consistent with the above, are not critical and are not considered part of the instant invention.

Representative diluents or reaction media suitable for use in this process are materials which are not detrimentally reactive under the reaction conditions with chlorine, the bipyridine reactant or products. Such diluents include, for example, nitrogen, carbon dioxide, dichloromethane, tetrachloroethylene, hexachlorobutadiene, chloroform, carbon tetrachloride, and the like. The preferred diluent is carbon tetrachloride.

A reactor temperature of from about 200° to 400°C. is suitable, while about 240° to 375°C. is preferred. Contact times of the bipyridine/diluent mixture and chlorine of from about 1 to 100 seconds are generally sufficient for chlorination to occur, while about 10 to 40 seconds are preferred.

A mole ratio of chlorine to bipyridine of about 1/1 to 100/1 is suitable, about 10/1 to 45/1 being preferred. The feed should generally be at least from about 5 weight percent bipyridine in diluent to a saturated solution. It has been found that a 5 to 10 weight percent solution is typically suitable.

Operating pressures are not critical and may vary from subatmospheric to somewhat superatmospheric. Atmospheric pressure is satisfactory and is preferred.

In a preferred method of carrying out the process of the present invention, a bipyridine reactant and diluent are first introduced into an evaporator to produce a vaporized mixture of the bipyridine compound in an inert diluent. The exit of the evaporator is maintained at a temperature at which rapid vaporization of the mixture occurs, usually about 25°–50°C. above the boiling point of said bipyridine. Any vaporizing device may be employed, but a wiped-film evaporator has been found most convenient.

For efficient operation it is necessary that the rate of reactant and diluent introduction and/or temperature of the evaporator be maintained so as to completely vaporize the reactant bipyridine compound and maintain it in the vaporized state. It has been noted that incomplete vaporization results in decreased yield of the desired chlorinated bipyridine product. The mixed vapors are conducted from the evaporator and rapidly and turbulently mixed with the gaseous chlorine. Preferably, this mixing occurs just prior to entry into a chlorinating reactor in which the resulting gaseous mixture is subjected to a turbulent flow under the temperature and time conditions set forth above. Ordinarily, a turbulence sufficient to provide a Reynolds number of from about 800 to about 2000 is used and an inlet vapor velocity of about 1000 to 2000 centimeters per second has been found to be satisfactory. The reactor is preferably insulated to permit the reaction to take place under adiabatic conditions. Alternatively, non-adiabatic conditions can be employed wherein conventional heat exchange techniques are employed to maintain the reaction temperature, making appropriate adjustments in the heat capacity of the reaction mixture by regulating the proportion of diluent employed.

The actual mixing of the vaporized reactants can be accomplished in a nozzle which in turn injects the mixture into the chlorinating reactor. Alternatively, the mixed vapors of bipyridine compound and diluent and gaseous chlorine may be simultaneously but separately introduced into the reactor; in such a case, for optimum yields, the chlorine must be jetted-in close to the point of introduction of the bipyridine compound and, in such a manner, ensure very rapid mixing and turbulent flow of the reactants.

The vapors passing from the reactor are cooled or quenched to separate (a) a liquid mixture comprising polychlorinated bipyridine products, diluent and unreacted or partially reacted bipyridine compounds from (b) a gaseous mixture comprising chlorine and hydrogen chloride by-product.

The liquid mixture may be fractionally distilled to recover the desired products in substantially pure form or may be cooled to precipitate the product which is then recovered by conventional methods, such as filtration. The product, whether recovered by distillation or by precipitation and filtration, may then be further purified, if desired, by methods well known to those skilled in the art.

Any suitable reactor may be employed and, since the reaction is exothermic, strong heating is required only at the initiation of the reaction. Thereafter heat input is only necessary to compensate for heat loss to the environment. The inlets, outlets and interior surfaces of the reactor must be of materials which resist corrosive attack by chlorine and hydrogen chloride at high temperatures. Thus, for example, such surfaces may be nickel, carbon, silica or glass. In practice, it has been found that thermally resistant, high-silica glass, such as Vycor brand, is satisfactory.

SPECIFIC EMBODIMENTS

In order to illustrate the process of this invention, an apparatus was prepared consisting of a cylinder of Vycor high-silica glass (8.3 cm. in diameter and 41.5 cm. in length) which was tapered to inlet and outlet tubes and fitted with electrical heating coils and insulation to serve as a reactor having a capacity of about 2.25 liters. The outlet end of said reactor was connected to a cooled collection vessel which was vented through a reflux condenser to an acid-gas recovery system.

The inlet tube ended in a nozzle projecting about 2.5 cm. into the reactor and having an opening into the reactor about 2.5 mm. in diameter. Inside the nozzle was a smaller concentric tube for chlorine introduction, said tube ending about 2.5 cm. upstream from the nozzle opening. The upstream end of the inlet tube was connected to an electrically heated vaporizer-preheater-tube used for mixing the bipyridine reactant and the inert diluent.

In practice, then, a solution of 10 weight percent of 2,2'-bipyridine in $CCl_4$ or 5 weight percent of 4,4'-bipyridine in $CHCl_3$ (substituted bipyridines are introduced in the same manner) was forced under 0.35 kg./cm.$^2$ nitrogen pressure from a feed reservoir through a rotometer into the vaporizer/preheater tube, said tube having an exit temperature of from 300°–385°C. The hot feed vapor was then forced into the nozzle where it was mixed with chlorine which had passed through another rotometer. The mixed gaseous reactants were then jetted through the nozzle orifice into the reactor, the hot effluent reactor gases from the reactor being trapped in two consecutive dry-ice traps.

Generally the product was recovered by removing the excess chlorine, hydrogen chloride by-product and diluent on a steam bath. The solids were then dissolved in a solvent, such as dichloromethane, the solution treated with activated charcoal, and the solvent removed on a steam bath. Product identification was by gas/liquid chromatography (GLC).

The examples below detail specific run conditions, and product work-up and analysis:

EXAMPLE 1

Feed — 10 weight percent of 2,2'-bipyridine (B.P.) in $CCl_4$
Feed Rate — 2.52 g./min.
Chlorine Rate — 4.2 g./min.
Molar Ratio — $Cl_2$/B.P. — approximately 37/1
Reactor Temperature — 300°C.
Contact Time — 38 seconds
Nozzle Velocity — 1210 cm./sec.
Run Time — 189 minutes After evaporation of excess $Cl_2$ and HCl by-product, benzene was added to the mixture, which was then brought to boiling and filtered hot. There was 7.2 g. of insoluble residue. 35.3 g. of crystalline 6,6'-dichloro-2,2'-bipyridine (51.4% of theory) were recovered from the filtrate, the structure being confirmed by analysis.

EXAMPLE 2

Feed — 10 weight percent of 2,2'-bipyridine (B.P.) in $CCl_4$
Feed Rate — 3.95 g./min.
Chlorine Rate — 7.0 g./min.
Molar Ratio — $Cl_2$/B.P. — approximately 39/1
Reactor Temperature — 240°C.
Contact Time — 26 seconds
Nozzle Velocity — 1775 cm./sec.
Run Time — 380 minutes After evaporating the excess $Cl_2$ and HCl by-product, the dichloromethane (dichlor) - insoluble salt was filtered, slurried in dichlor, and neutralized with 10 percent caustic. The organic layer was separated and dried over anhydrous $MgSO_4$. The filtered solution yielded 42.5 g. of starting material.

The dichlor-soluble material amounted to 113 g., which analyzed (GLC):

67.2 mole percent 6-chloro-2,2'-bipyridine 30.9 mole percent 6,6'-dichloro-2,2'-bipyridine
1.8 mole percent unknown.

EXAMPLE 3

Feed — 5 weight percent of 4,4'-bipyridine (B.P.) in CHCl$_3$.
Feed Rate — 3.57 g./min.
Chlorine Rate — 3.35 g./min. (preheated to 400°C.)

Molar Ratio — Cl$_2$/B.P. — Approximately 41/1 (CHCl$_3$ will react and consume part of the Cl$_2$).
Reactor Temperature — 270°C.
Contact Time — 39 seconds
Nozzle Velocity — 1165 cm./sec.
Run Time — 23 minutes.

After neutralization and recovery as above, 3.2 grams of product was obtained which analyzed (GLC):

55.2 mole percent 4,4'-bipyridine
29.3 mole percent 2-chloro-4,4'-bipyridine
9.0 mole percent 2,2'-dichloro-4,4'-bipyridine.

EXAMPLE 4

Feed — 5 weight percent of 4,4'-bipyridine (B.P.) in CHCl$_3$.
Feed Rate — 4.12 g./min.
Chlorine Rate — 3.35 g./min. (preheated to 400°C.)

Molar Ratio — Cl$_2$/B.P. — approximately 36/1.
Reactor Temperature — 320°C.
Contact Time — 34 seconds.
Nozzle Velocity — 1350 cm./sec.
Run Time — 36 minutes.

After neutralization and recovery as above, 8.7 grams of product was obtained. Analysis (GLC) indicated the presence of the following mixture:
48.2 mole percent 2,2'-dichloro-4,4'-bipyridine
34.0 mole percent 2,2',6-trichloro-4,4'-bipyridine
16.0 mole percent 2,2',6,6'-tetrachloro-4,4'-bipyridine
1.9 mole percent unknown.

EXAMPLE 5

Feed — 5 weight percent of 4,4'-bipyridine (B.P.) in CHCl$_3$.
Feed Rate — 4.2 g./min.
Chlorine Rate — 3.35 g./min. (preheated to 350°C.)

Molar Ratio — Cl$_2$/B.P. - approximately 36/1
Reactor Temperature — 375°C.
Contact Time — 31 seconds.
Nozzle Velocity — 1480 cm./sec.
Run Time — 81 minutes.

After work-up as indicated above, 25 g. of product was recovered. Analysis (GLC) indicated the following mixture:
51.9 mole percent 2,2',6,6'-tetrachloro-4,4'-bipyridine
30.9 mole percent 2,2',6-trichloro-4,4'-bipyridine
16.0 mole percent 2,2'-dichloro-4,4'-bipyridine
1.2 mole percent unknown.

Substituted 2,2'- and 4,4'-bipyridines, such as those listed above, are chlorinated similarly to the unsubstituted compounds reported in the above experiments.

I claim:
1. A process for producing a chlorinated bipyridine consisting essentially of 6,6'-dichloro-2,2'-bipyridine; 6-chloro-2,2'-bipyridine; 6,6'-dichloro-2,2'-bipyridine; 2-chloro-4,4'-bipyridine; 2,2'-dichloro-4,4'-bipyridine; 2,2',6-trichloro-4,4'-bipyridine; 2,2',6,6'-tetrachloro-4,4'-bipyridine; and combinations thereof, by rapidly and turbulently contacting a prevaporized mixture of a diluent and a 2,2'- or 4,4'-bipyridine with a stoichiometric excess of gaseous chlorine at a temperature of from about 200° to 400°C. for no more than about 100 seconds.

2. The process of claim 1 wherein there is an amount of bipyridine present in the diluent sufficient to form from a 5 weight percent solution to a saturated solution.

3. The process of claim 1 wherein the contact time is from about 10 to 40 seconds.

4. The process of claim 1 wherein the reaction temperature is between about 240° and 375°C.

* * * * *